United States Patent [19]

Fujiki et al.

[11] Patent Number: 5,102,041

[45] Date of Patent: Apr. 7, 1992

[54] AIR CONDITIONING SYSTEM FOR AUTOMOTIVE VEHICLE

[75] Inventors: Tsutomu Fujiki; Toshikazu Ishikawa, both of Hiroshima, Japan

[73] Assignee: Mazda Motor Corporation, Hiroshima, Japan

[21] Appl. No.: 631,692

[22] Filed: Dec. 19, 1990

[30] Foreign Application Priority Data

Dec. 19, 1989 [JP] Japan ............................ 1-327143
Dec. 28, 1989 [JP] Japan ............................ 1-338468

[51] Int. Cl.$^5$ ............................................. F24F 7/00
[52] U.S. Cl. .................................... 236/49.3; 165/16; 454/75
[58] Field of Search ............... 165/12, 16; 98/2.01, 98/2, 40.3; 236/49.3, 46 F

[56] References Cited

U.S. PATENT DOCUMENTS 4,875,624 10/1989 Hara et al. ..................... 236/49.3
4,978,061 12/1990 Ogihara et al. ................. 236/49.3

FOREIGN PATENT DOCUMENTS 62-18312 1/1987 Japan .

*Primary Examiner*—Harry B. Tanner
*Attorney, Agent, or Firm*—Fish & Richardson

[57] ABSTRACT

Air conditioning is so implemented as to allow a current of air fed into a passenger compartment of the vehicle to be closer to or approach to a gentle and natural wind by making the applicable voltage to the blower motor variable so as to change the air volume or amount to a subtle extent for a stable period of time when the air volume or amount to be fed into the compartment is reduced to a small level under automatic control.

10 Claims, 9 Drawing Sheets

AIR CONDITIONING SYSTEM FOR AUTOMOTIVE VEHICLE

BACKGROUND OF THE INVENTION

1. Field of the Invention

The present invention relates to an air conditioning system for an automotive vehicle for air-conditioning a compartment of the automotive vehicle.

2. Description of Related Art

Heretofore, an air conditioning apparatus is known of such a type as setting a required compartment temperature particularly by manual operation and carrying out automatic control so as to allow the compartment temperature to reach the set required compartment temperature in accordance with changes in situations inside and outside the vehicle compartment. Such an air conditioning apparatus has a compartment temperature setting device disposed within the vehicle compartment, thereby allowing the driver and/or the passengers to manually operate the compartment temperature setting device so as to set a required compartment temperature. It is common that the air conditioning apparatus is subjected to automatic control on the basis of the difference between the actual compartment temperature and the set compartment temperature.

Japanese Laid-open Patent Application No. 18312/1987 discloses technology relating to the automatic control of the amount of air flow, in which the amount of air flowing is increased when the difference between the vehicle compartment temperature set on the thermostat and the actual compartment temperature is large, while the amount of air flow is reduced, thereby retaining a state in which the air is flowing gently, when the difference between the temperature set on the thermostat and the actual compartment temperature is small.

Generally, passengers feel that a gentle and natural wind or air flow is pleasant, and it seems that they have this feeling because such a gentle wind or air flow changes its magnitude and direction in a slight yet constant manner.

SUMMARY OF THE INVENTION

Therefore, the present invention has the object to provide an air conditioning system for an automotive vehicle adapted to provide a gentle current close to a natural wind, thereby allowing passengers to feel pleasant breeze as if they are exposed to a natural and gentle wind.

If the direction of a current of air would be changed to a subtle extent in order to make the current of air closer to a gentle and natural wind, a movable louver should be mounted to a trunk air outlet. Further, the movable louver is mounted in association with a driving means for driving the movable louver and altering the direction thereof or with an association mechanism between the driving means and the movable louver. The addition of these elements raises costs of manufacture as a matter of course. Therefore, the present invention is designed to achieve the aforesaid object of the present invention by changing a current flow amount of air to a subtle extent.

More specifically, in order to achieve the aforesaid object, the present invention consists of an air conditioning system of an automotive vehicle, comprising:

a compartment temperature detecting means for detecting a compartment temperature;

a compartment temperature setting means for setting a required compartment temperature by manual operation;

a blower for feeding an air-conditioned air to a vehicle compartment;

an air volume control means for controlling an air volume or amount to be fed by the blower on the basis of a difference between an actual compartment temperature detected by the compartment temperature detecting means and the required compartment temperature set by the compartment temperature setting means;

a stable-state detecting means for detecting a stable period of time during which the difference between the actual compartment temperature and the required compartment temperature is so small and the air volume or amount is so small and stable; and a natural wind (air volume or amount) control means for making the air volume or amount set by the air volume control means variable in response to a signal from the stable-state detecting means when the stable period of time has come.

In accordance with the present invention, as the current of air fed is so adjusted as to be variable during a stable period during which the amount of the air current is rendered small, the current of air fed is provided as if it were a natural and gentle air. As a result, the driver and passengers can feel pleasant as if they are exposed to a natural wind due to changes in amounts of the current of air fed. Further, the air conditioning system according to the present invention has the advantage that it can use a conventional air-conditioning device as it is, so that addition of no new part is required and consequently no costs of manufacture can be raised.

Other objects, features and advantages of the present invention will become apparent in the course of the description of the preferred embodiments, which follows, with reference to the accompanying drawings.

DESCRIPTION OF THE PREFERRED EMBODIMENTS

The present invention will be described in more detail with reference to the accompanying drawings.

Figure 1:
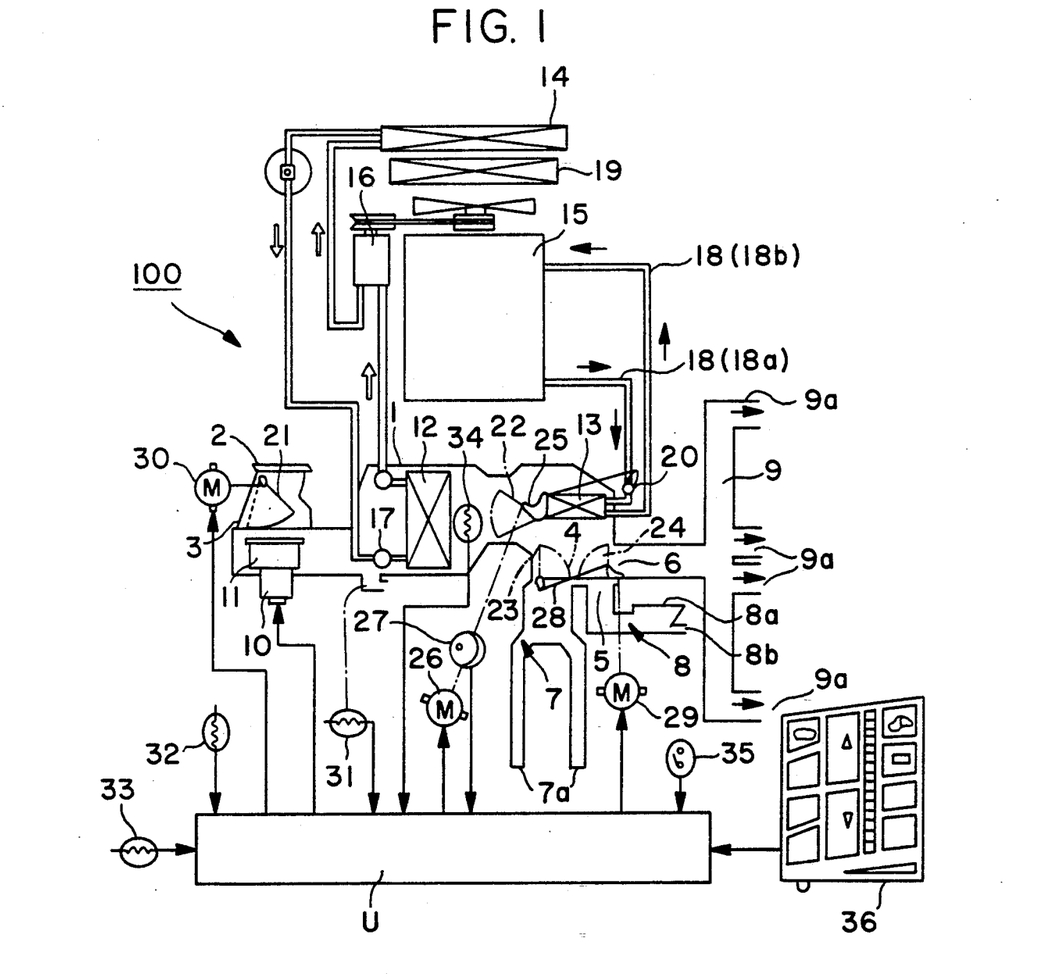
FIG. 1 is a diagrammatic representation showing an embodiment of the control system in accordance with the present invention.

FIG. 1 is a diagrammatic representation of a layout of an air conditioning apparatus 100 according to the present invention. A main duct 1 is provided at its upstream end portion with an outside air inlet 2 and an inside air inlet 3 for drawing the air in the vehicle compartment and at its downstream end portion with a first outlet 4, a second outlet 5 and a third outlet 6. The first outlet 4 is communicated with a heater duct 7 and the second outlet 5 is communicated with a differential duct 8, while the third outlet 6 is communicated with a vent duct 9. Ducts 1, 7, 8 and 9 form an air passage.

The heater duct 7 has its outlet 7a disposed at the foot of the passengers seated on the front seats. The differential duct 8 is provided with a first outlet 8a and a second outlet 8b, the first outlet 8a being disposed along a lower edge of a window glass panel and the second outlet 8b being so disposed at both left-hand and right-hand end portion of an instrument panel as to face each of corner portions of a front window glass panel. The vent duct 9 has its outlet 9a disposed so as to allow the front seaters' faces to be exposed to the current of air blown therefrom.

The main duct is provided within its inside with a fan 11, an evaporator 12 and a heater core 13, which are disposed in this order from its upstream side to its downstream side. The fan 11 is driven by an electrically drivable motor (a blower motor) 10.

The evaporator 12 constitutes a cooling circuit, in association with a condenser 14, a compressor 16 to be mechanically drivable by the engine 15, an expansion valve 17, and so on, thereby allowing a refrigerant to be circulated in the direction as indicated by the arrows in FIG. 1.

The heater core 13 is connected to a cooling water passage within the engine 15 through a piping 18. The cooling water drawn from the cooling water passage within the engine 15 is led to the heater core 13 through an upstream piping 18a, and the cooling passed through the heater core 13 is then circulated to the engine 15 through a downstream piping 18b. The amount of the cooling water to be passed through the heater core 13 is to be adjusted by a flow rate control valve 20 which in turn is mounted to the upstream piping 18b. In FIG. 1, reference numeral 19 denotes a radiator.

The main duct 1 is provided with an inside-outside air door 21, an air mixing door 22, a first mode door 23 and a second mode door 24. The inside-outside air door 21 is so interposed between the outside air inlet 2 and the inside air inlet 3 as to adjust a ratio of an amount of the air to be drawn from the inside to an amount of the air to be drawn into the vehicle compartment. The air mixing door 22 is so interposed between the evaporator 12 and the heater core 13 as to adjust a ratio of an amount of the air passing through the heater core 13 to an amount of the air bypassing the heater core 13. Further, the first mode door 23 is disposed at an upstream end of the heater duct 7, while the second mode door 24 is interposed between the upstream end of the differential duct 8 and the upstream end of the vent duct 9. The first mode door 23 and the second mode door 24 adjust the rates of the conditioned air to be drawn into the heater duct 7, the differential duct 8 and the vent duct 9.

The air mixing door 22 is disposed so as to be associated with the flow rate control valve 20 through a bell-crank 25 which in turn is disposed in association with an electrically drivable motor (a first motor) 26, thereby opening or closing the air mixing door 22 as well as adjusting a rate of opening the flow rate control valve 20. The amount of operation of the electrically drivable motor 26, i.e. the opening angle of the air mixing door 22, is detected by a potentiometer 27.

Figure 2:
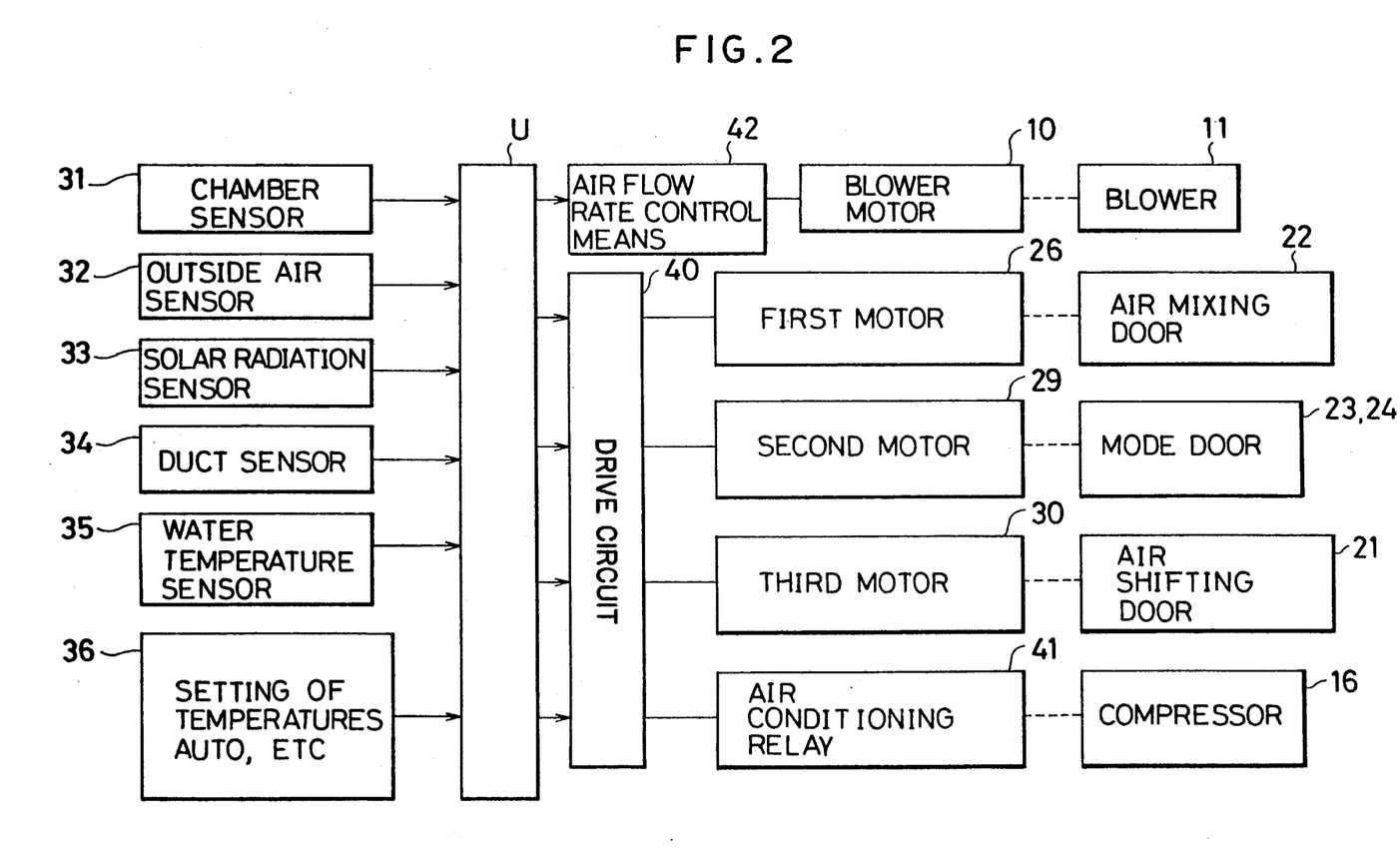
FIG. 2 is a block diagram showing the embodiment of the control system according to the present invention.

As shown in FIGS. 1 and 2, reference symbol U denotes a control unit composed of, for example, a microcomputer which in turn is composed of a central processing unit (CPU), a read-only memory (ROM), a random access memory (RAM), and so on. The control unit U is designed such that signals are inputted from sensors 31 to 34, inclusive, and a switch 35. The sensor 31 is a compartment temperature sensor for sensing the temperature of the vehicle compartment disposed within the vehicle compartment. The sensor 32 is an outside air sensor for sensing the temperature of the outside air. The sensor 33 is a solar radiation sensor for sensing an amount of solar radiation to be penetrated into the vehicle compartment. The sensor 34 is a duct sensor so disposed on the downstream side of the evaporator 12 as to sense the temperature of the air which has passed through the evaporator 12 within the main duct 1. The switch 35 is a water temperature switch for sensing the temperature of the cooling water for cooling the engine. The control unit U is further provided with a signal from a setting device 36 disposed within the vehicle compartment, and the setting device 36 is provided with various manual switches for setting the temperature, rate of the air current, the temperatures of the inside and outside air, blowing mode and so on, as well as the automatic switch (AUTO). The AUTO switch is so designed as to implement automatic control when it is turned on.

On the other hand, the control unit U generates control signals for the motor (first motor) 26 for the air mixing door 22, a motor (second motor) 29 for the mode doors 23 and 24, a motor (third motor) 30 for the outside-inside air door 21, and a relay 41 for the compressor 16, through the driving circuit 40. Further, the control unit U generates a control signal to the blower motor 10 through an air current rate control means 42.

Description will be made of an outline of the control contents by means of the control unit U.

Figure 3:
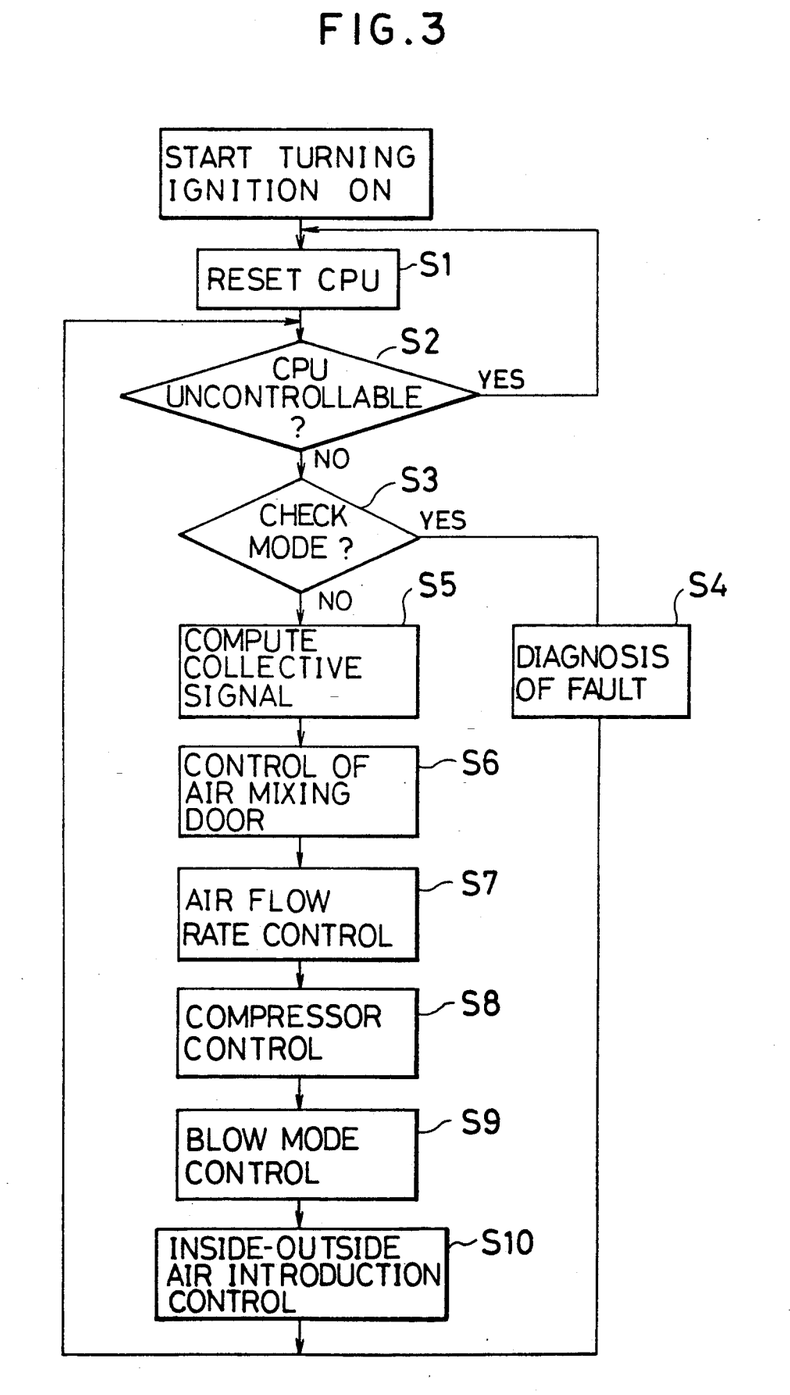
FIG. 3 is a flowchart showing an embodiment of the overall control for the air-conditioning system according to the present invention.

When the AUTO switch of the setting device 36 is turned off, on the one hand, there are formed control conditions based on the blow mode set manually, and other modes, set by the setting 36, thereby generating a control signal for manual control. When the AUTO switch of the setting device 36 is turned on, on the other hand, the microcomputer (CPU) of the control unit U is reset at step S1 of the flowchart of FIG. 3. Then, at step S2, a decision is made to determine if the central processing unit (CPU) is uncontrollable, followed by proceeding to step S3 when the result of decision at step S2 indicates that the central processing unit is controllable. At step S3, it is decided to determine if a failure exists by the check mode. If the result of decision at step S3 indicates that the failure exists, then the program flow goes to step S4 at which the failure is diagnosed, followed by the return to step S2 from which the aforesaid processing is repeated. When it is decided at step S3 that no failure exists, then the program flow goes to step S5 at which a collective signal T is computed from the following relationship on the basis of the output signals from the temperature detecting means and the temperature setting means:

$$T = (tr - 25) + \alpha(ta - 25) + \beta(td - 12) - \gamma(Td - 25)$$

where tr is the temperature detected by the compartment sensor;
ta is the temperature detected by the outside air sensor;
td is the temperature detected by the duct sensor;
Td is the set compartment temperature (required compartment temperature); and
$\alpha$, $\beta$ and $\gamma$ are each correction coefficients (provided that, since the correction coefficients $\alpha$, $\beta$ and $\gamma$ vary with the air-conditioning system, characteristics of the vehicle body, and so on, they are to be determined by the running tests).

It is to be noted herein that the collective signal T is basically intended to mean the difference between the required compartment temperature Td set manually by the setting device 36 and the actual compartment temperature tr and it is set with the attempt to optimize the difference by correcting it by the temperature of the outside air.

The opening angle of the air mixing door 22 is controlled at step S6 on the basis of the value obtained as the collective signal T computed by the central processing unit (CPU), thereby adjusting the air amount, or air volume, passing through the heater core 13 at step S7. Thereafter, at step S8, the volume of air to be fed from the blower 11 is adjusted by controlling the terminal voltage $V_B$, thereby controlling the operation or suspension of the compressor 16. Then, at step S9, the blow mode is chosen and, at step S10, the shift control for changing the inside air by the outside air by driving the inside-outside door 21. In summary, when the AUTO switch is being turned on, comprehensive air conditioning is implemented on the basis of the collective signal T.

Then, detailed description will be made on the control over the current of air to be fed. It is to be noted that the larger the absolute value of the collective signal T the larger the difference between the compartment temperature (tr) and the set temperature (Td), so that the air amount or the air volume is set to a strong air amount or air volume by maximizing the terminal voltage $V_B$ of the blower motor 10 in order to quickly make the difference between the temperatures between them smaller, thereby enhancing the air-cooling capability or the air-warming capability to its maximum level. Thereafter, as the compartment temperature (tr) is approaching to the set temperature (Td) and consequently the air-cooling capability or the air-warming capability have a margin, the terminal voltage $V_B$ is decreased gradually at a predetermined gradient, thereby reducing the air amount or volume stepwise. And when the value of the collective signal T has reached a range which is close to zero, namely, when it reaches the stable period during which the compartment temperature and the set temperature become a value equal to or lower than the predetermined value, the terminal voltage $V_B$ is caused to become the lowest voltage, thereby retaining the air amount or volume at a subtle rate. The changes of the air amount are shown in FIG. 4.

Figure 4:
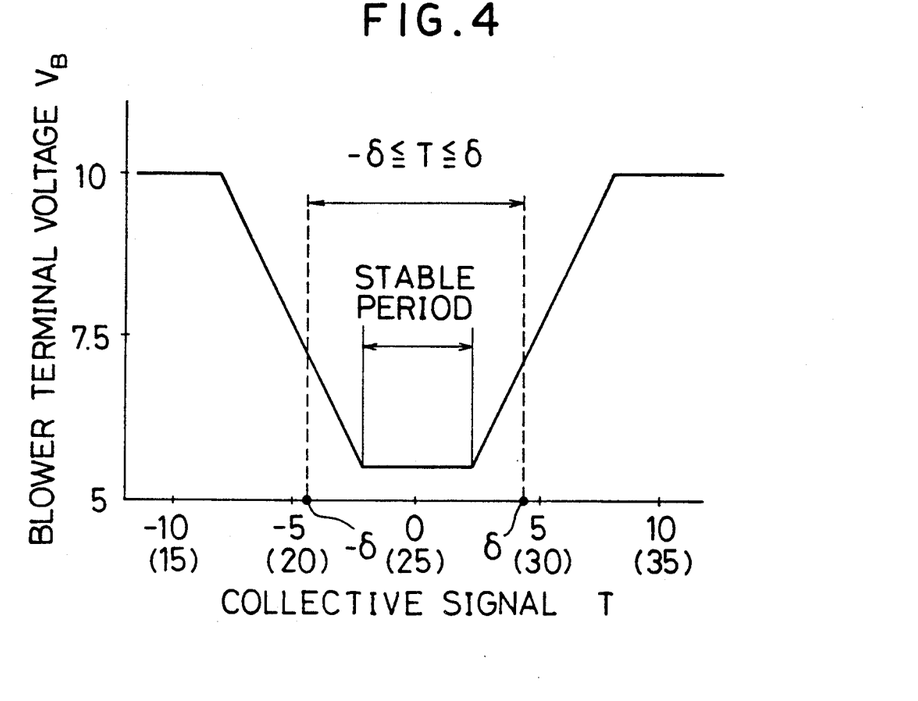
FIG. 4 is a control characteristic diagram showing the relationship of the collective signal T with the terminal voltage of the blower motor.

As shown in FIG. 4, the figures within the parenthesis are intended to means compartment temperatures corresponding to when the outside air temperature is 25° C., the set temperature is 25° C., and the temperature detected by the duct sensor is 12° C.

In the control over the amount or volume of air to be fed at step S7 of FIG. 3, as shown in FIG. 4, when the collective signal T is in the range from the value equal to or larger than $-\delta$ to the value equal to or smaller than $+\delta$ (where $\delta$ is a predetermined value), namely, in the range wherein the air amount or air volume is made smaller, a so-called natural wind control will be carried out in the manner as will be described hereinafter with reference to FIGS. 5 and 6. It is to be noted herein that the terms "natural wind" referred to herein with reference to the terms "natural wind control" or related terms are intended to mean "current of air as if it is controlled as a natural and gentle wind".

The natural wind control is to subtly increase or decrease the amount or volume of air to be fed by altering the blower terminal voltage $V_B$ and the range of changing the air amount or volume may be determined by the following formulas:

$$x = 1.11 V_{B0} + 0.23$$

$$y = 0.26 V_{B0} + 2.68$$

where $V_{B0}$ is a terminal voltage of the blower 10 set on the basis of the collective signal T.

Figure 5:
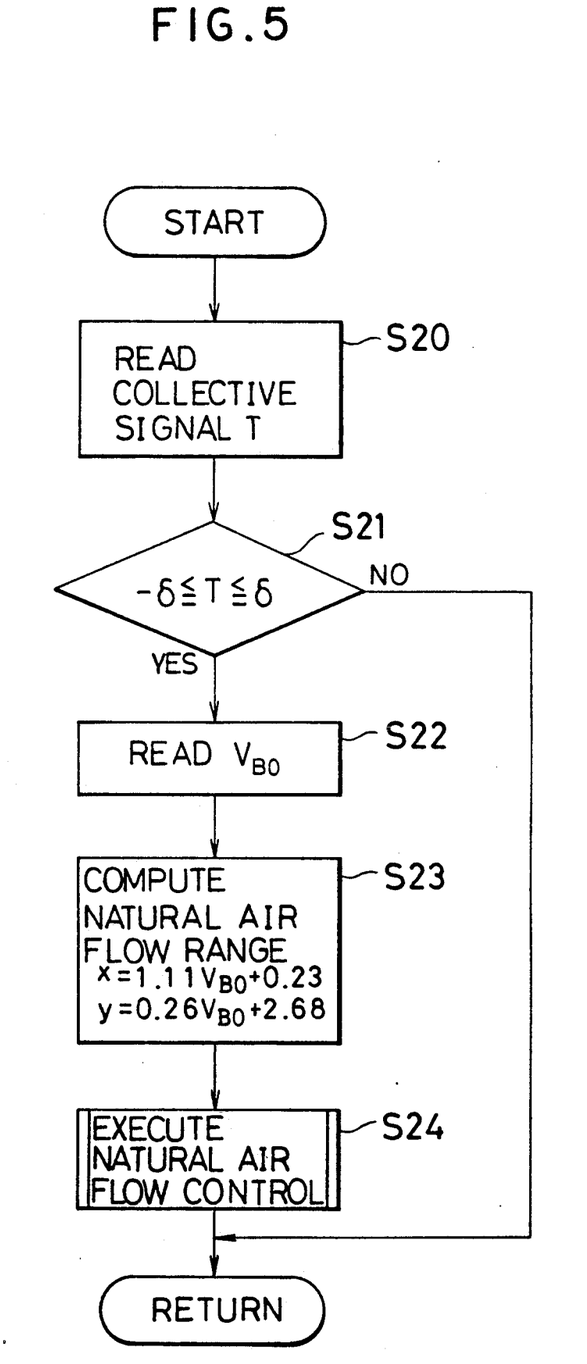
FIG. 5 is a flowchart showing an example of the natural wind (air volume or amount) control according to a first embodiment of the present invention.
Figure 6:
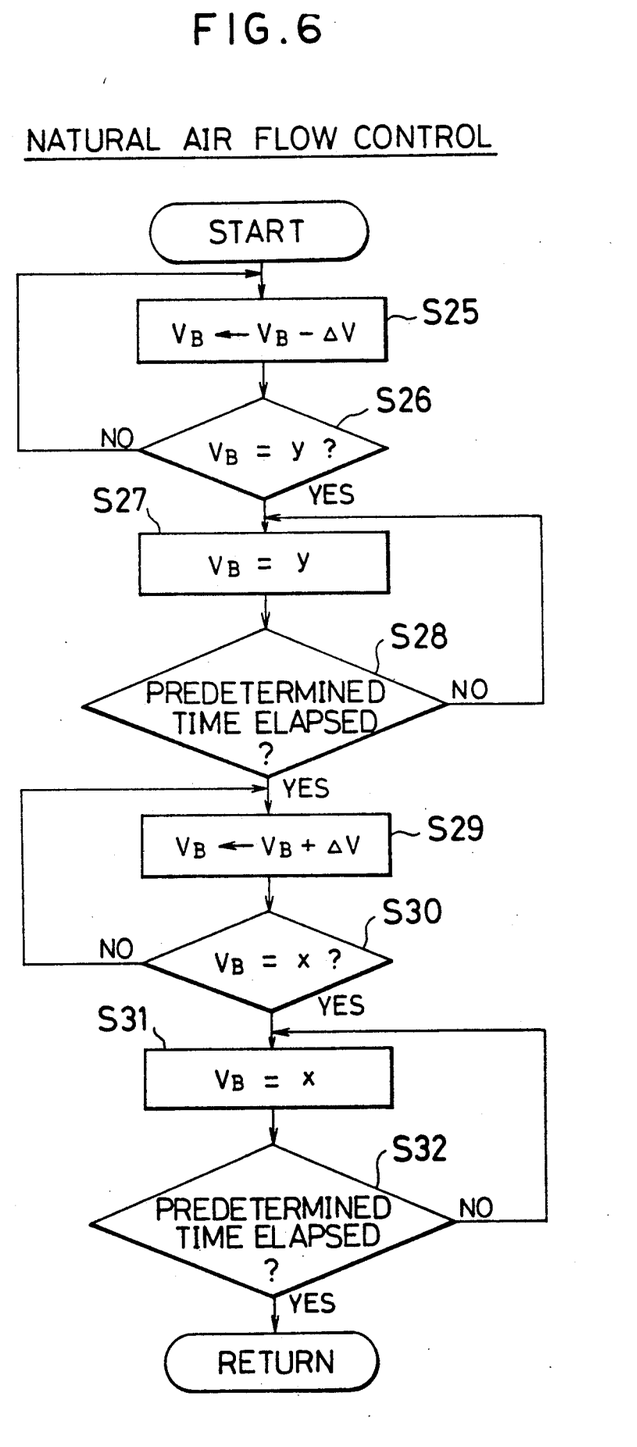
FIG. 6 is a flowchart showing an example of the natural wind (air volume or amount) control according to the first embodiment of the present invention.

Given the foregoing, an example of the natural wind control will be described in detail on the basis of the flow chart as shown in FIGS. 5 and 6.

Referring to FIG. 5, the collective signal T (at step S5 of FIG. 3) is read at step S20 and a decision is made at step S21 to determine if the collective signal T ranges from the value equal to or larger than the predetermined value $-\delta$ to the value equal to or smaller than the predetermined value $\delta$. When the result of decision at step S21 indicates that the collective signal T is within the aforesaid range, then the program flow goes to step S22 at which the terminal voltage $V_{B0}$ of the blower motor 10 (the voltage being set on the basis of the collective signal T and being sometimes referred to hereinafter as the reference voltage) is read. Then, at step S23, the values x and y specifying the width of changing the air volume or amount are determined on the basis of the formulas as described hereinabove, thereby carrying out the natural wind control at step S24.

FIG. 6 shows the detail of the natural wind control as shown at step S24 of FIG. 5.

First, at step S25, the terminal voltage $V_B$ of the blower motor 10 is decreased by a predetermined value ($\Delta V$), and this processing is to be repeated at step S26 until the terminal voltage $V_B$ reaches the lower limit value y. This processing allows the air volume or amount obtainable under the reference voltage $V_{B0}$ to be reduced to the air volume or amount obtainable by the lower limit voltage y. In other words, if it is decided at step S26 that the terminal voltage $V_B$ does not yet reach the lower limit value y, on the one hand, the program flow goes back to step S25 at which the terminal voltage $V_B$ is reduced by the predetermined value ($\Delta V$). When the result of decision at step S26 indicates that the terminal voltage $V_B$ is equal to the lower limit voltage y, on the other hand, this state is to be continued for a predetermined period of time, for example, for one to two seconds, at step S28.

When it is decided at step S28 that the predetermined period of time has been elapsed, then the program flow goes to step S29 at which the terminal voltage $V_B$ of the blower motor 10 is increased by the predetermined value ($\Delta V$). This processing is repeated until the terminal voltage $V_B$ reaches the upper limit value x at step S30. In other words, if the result of decision at step S30 indicates that the terminal voltage $V_B$ is not yet equal to the upper limit value x, then the program flow goes back to step S29 at which the predetermined value ($\Delta V$) is added to the terminal voltage $V_B$, followed by proceeding to step S30. When the result of decision at step S30 indicates that the reference voltage $V_B$ is equal to the upper limit value x, then the program flow goes to step S32 in order to continue this state for a predetermined period of time, for example, for one to two seconds.

Figure 7:
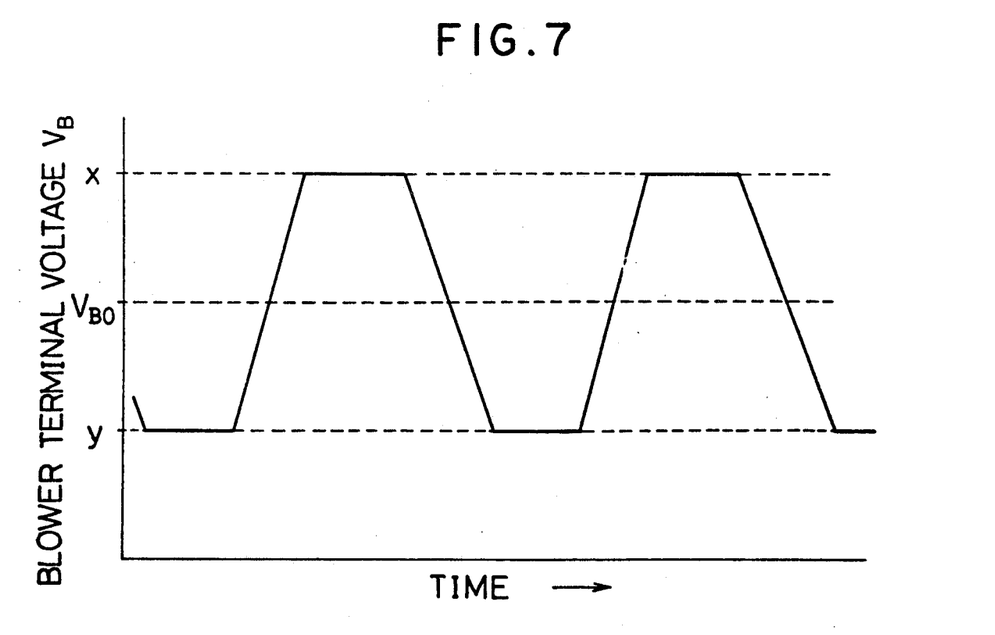
FIG. 7 is a graph for visually showing the content of the natural wind control in accordance with the first embodiment according to the present invention.

The aforesaid control allows the air volume or amount to be increased and decreased at predetermined cycles between the lower limit value y and the upper limit value x, as shown in FIG. 7, in the stable period in which the reference voltage $V_B$ is retained at an approximately constant value (minimum value), as shown in FIG. 4. Also, as shown in FIG. 4, when the collective signal T is located in a so-called "quasi-stable" period, excluding the aforesaid stable period, yet within the range from the value equal to or larger than the predetermined value $-\delta$ to the value equal to or smaller than the predetermined value $\delta$, the upper limit value x or the lower limit value y is varied with the change in the basic voltage $V_{B0}$, thereby carrying out the so-called natural wind control in the manner as described hereinabove.

Figure 8:
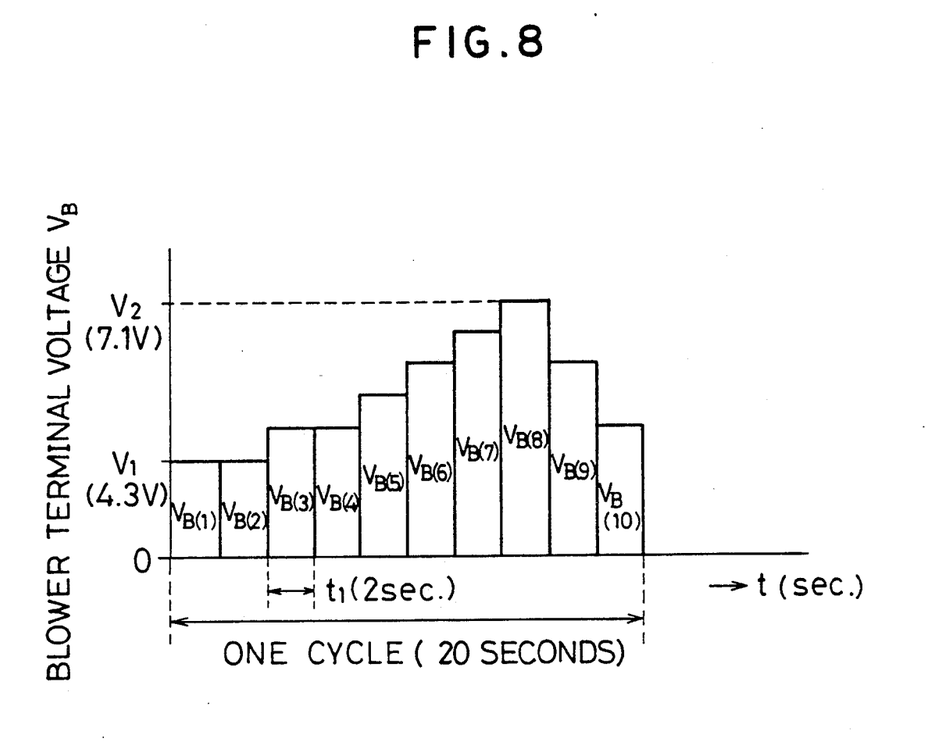
FIG. 8 is a graph showing a control pattern to be used for a second embodiment of the present invention.

It is to be noted herein that the terminal voltage $V_B$ of the blower motor 10 may be varied in a substantially linear manner by setting the predetermined value ($\Delta V$) indicated at step S25 or S29 to a very small value or that the terminal voltage $V_B$ thereof may be varied in a stepwise way by setting the predetermined value ($\Delta V$) to a comparably large value. It is further noted herein that the predetermined period of time as indicated at step S28 may differ from the predetermined period of time as indicated at step S32 and that the predetermined period of times may be set variable. In other words, the predetermined period of time may be changed in accordance with the number of passages of the loops as indicated by the program flow in FIG. 6, thereby allowing the cycles for increasing and decreasing the air amount or volume on the basis of this control to be changed on an irregular basis and enabling the current of air to be fed into the vehicle compartment to be approaching to or to become closer to a gentle and natural wind. Second Embodiment:

In this second embodiment, the changes of the terminal voltages $V_B$ in the stable period may be converted into a control pattern as shown in FIG. 8. For example, this pattern is so arranged that one pattern is to be executed for 20 seconds in one cycle and the pattern is to be repeated.

Figure 10:
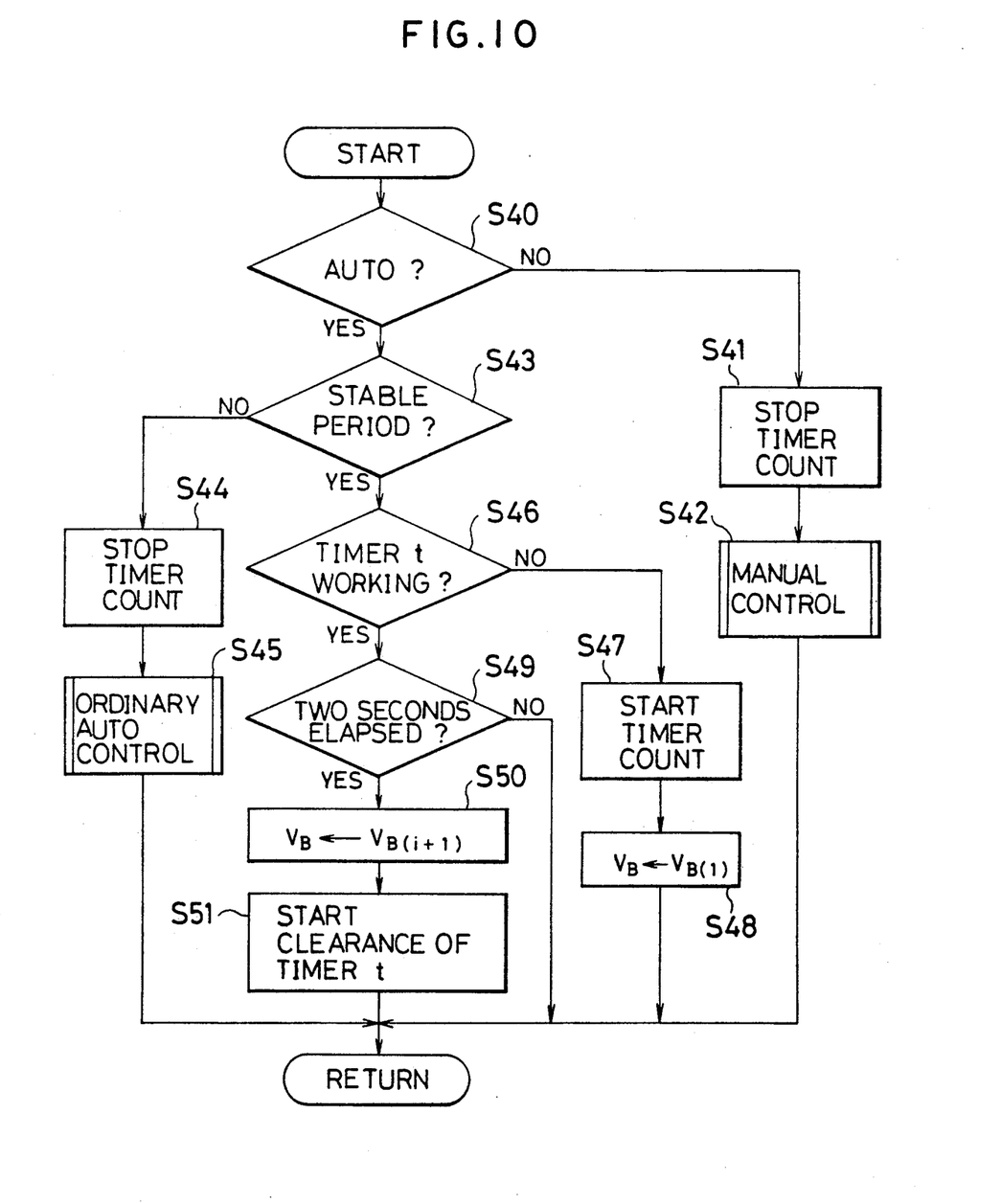
FIG. 10 is a flowchart showing an example of the control according to the second embodiment of the present invention.

More specifically, when the collective signal T is entered into the stable period, the terminal voltage $V_B$ of the blower motor 10 is so arranged as to be increased and decreased stepwise within the range from V1=4.3 V to V2=7.4 V. It is to be noted that the control pattern as shown in FIG. 10 is preset and stored in the ROM within the control unit U.

An example of the control will be described in more detail on the basis of the flowchart of FIG. 10.

After the start of the control over the blower, a decision is made at step S40 to determine if the air-conditioning is to be implemented by the AUTO mode. If it id decided at step S40 that the air-conditioning is implemented manually, on the one hand, then the program flow goes to step S41 at which the counting by a timer is suspended in the manner as will be described hereinafter, followed by the manual control at step S42 and the return of the program flow.

When the result of decision at step S40 indicates that the air-conditioning is implemented automatically, on the other hand, a decision is further made at step S43 to determine if the compartment temperature approaches to the set temperature and the absolute value of the collective signal T becomes so smaller as to reach the stable period of time. If the result of decision at step S43 indicates that the stable period of time does not come yet, then the program flow goes to step S44 at which the counting by the timer is suspended, followed by proceeding to step S45 at which ordinary AUTO control is carried out.

When it is decided at step S43 that the stable period has come, a decision is made at step S46 to determine if the timer t is working. If the result of decision at step S46 indicates that the timer t is not working, then the program flow goes to step S47 at which the counting by the timer is started, followed by proceeding to step S48 at which the terminal voltage $V_B$ is converted into the voltage $V_B(1)$ as shown in FIG. 8. Then the program flow is returned.

On the other hand, when it is decided at step S46 that the timer t is working, the program flow goes to step S49 at which the terminal voltage $V_B$ is retained in the $V_B1$ state until the time t1 counted by the timer t has elapsed by two seconds. When the results of decision at step S49 indicates that the time t1 has been elapsed by two seconds, then the program flow goes to step S50 at which the terminal voltage $V_B$ is converted to the voltage $V_B(2)$, as shown in FIG. 8. It is thus to be noted that the terminal voltage $V_B(i+1)$ is intended to means $V_B(i)$ being the previous terminal voltage and $V_B(i+1)$ being the current terminal voltage immediately after the previous terminal voltage $V_B(i)$. In other words, when the voltage $V_B(i)$ is $V_B(1)$, then the voltage $V_B(i+1)$ is $V_B(2)$, and when the voltage $V_B(i)$ is $V_B(10)$, the next voltage $V_B(i+1)$ is $V_B(1)$. When the terminal voltage $V_B$ has been changed at step S50, then the program flow goes to step S51 at which the timer t is cleared, thereby allowing the timer t to start again.

Figure 9:
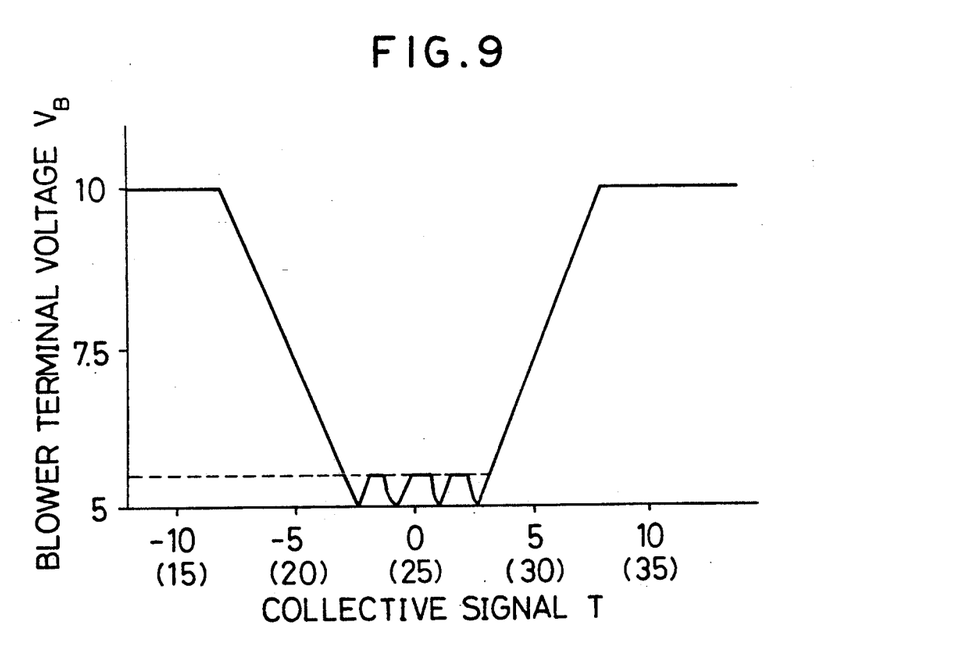
FIG. 9 is a control characteristic diagram showing the relationship of the collective signal T with the terminal voltage of the blower motor.

As described hereinabove, when the collective signal T reaches the stable period, the so-called natural wind control may be implemented by means of the control pattern as shown in FIG. 8 and the air volume or amount may be changed, or increased and decreased, in 20 seconds in one cycle, as shown in FIG. 9.

Figure 11:
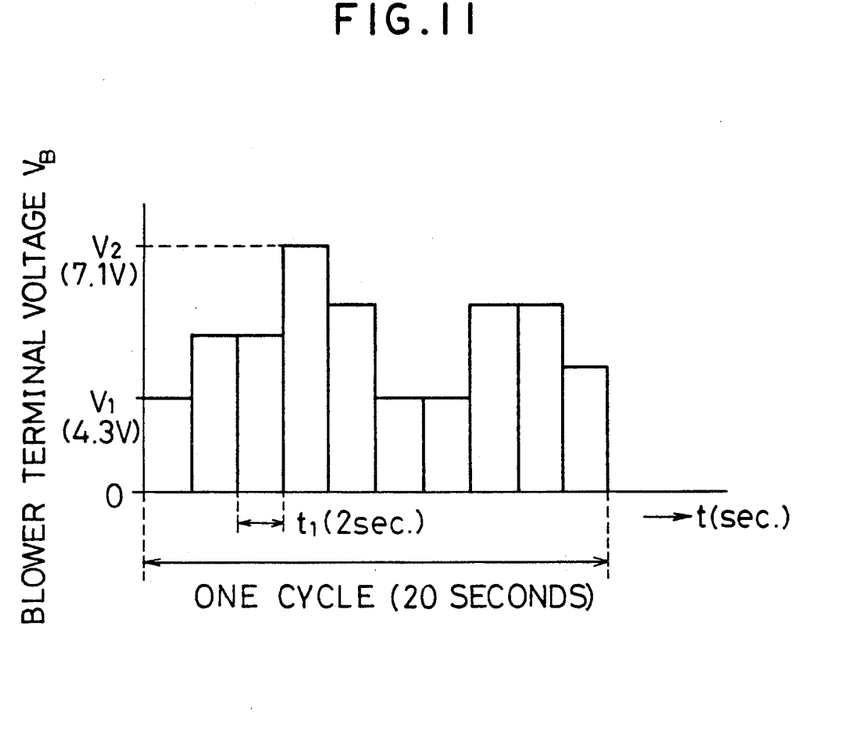
FIG. 11 is a pattern diagram showing a variant of the control pattern according to the second embodiment of the present invention.
Figure 12:
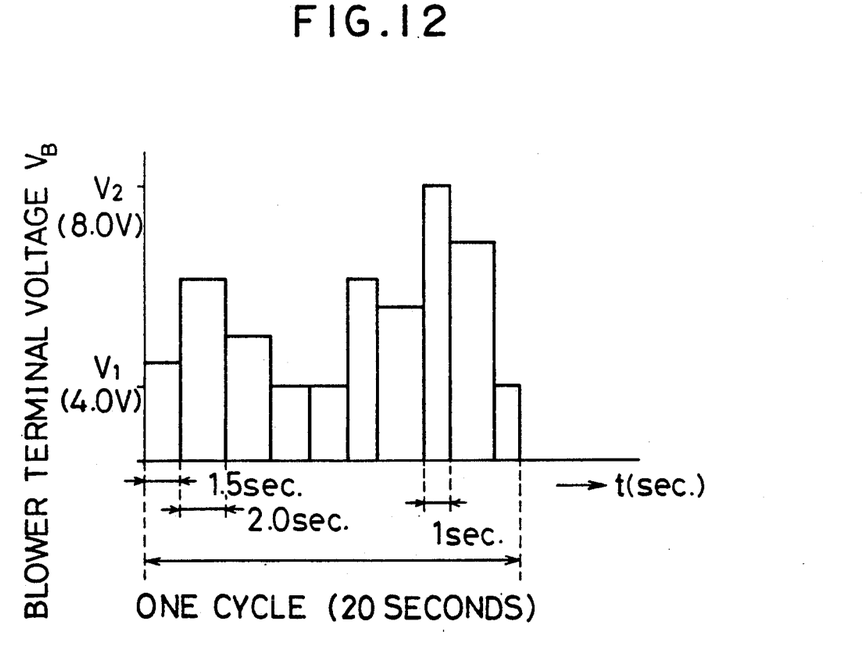
FIG. 12 is a pattern diagram showing a variant of the control pattern according to the second embodiment of the present invention.

FIGS. 11 and 12 shown variants of control patterns. For instance, as shown in FIG. 11, one or more than one control pattern different from that as shown in FIG. 8 may be prepared and they may be combined in any manner, thereby allowing the so-called natural wind control. More specifically, at step S50 in FIG. 10, when the terminal voltage $V_B(10)$ of FIG. 8 is set, then the control pattern may be shifted to the control pattern as shown in FIG. 11. In this case, the width of changes of the terminal voltage $V_B$ (the range from the voltage v1 to the voltage v2) in the control pattern may be altered to assume the range from v1=4.0 V to v2=8.0 V, as shown in FIG. 12. Further, as shown in FIG. 12, the timing at which the timer t is set may appropriately be altered. By these variants, the current of air to be fed into the vehicle compartment may be diversified into various modes or variations in the magnitude of the current of air. Futher, the cycle of the control pattern may also be deversified, thereby providing a current of air which can be felt closer to or approaching to a gentle and natural wind.

What is claimed is:

1. An air conditioning system for an automotive vehicle, comprising:
    compartment temperature detecting means for detecting an actual temperature within a vehicle compartment;
    compartment temperature setting means for manually setting a desired temperature within the vehicle compartment;
    blower means for feeding conditioning air to the vehicle compartment;
    air quantity control means for increasing an air quantity to be blown from the blower means when a deviation between the actual temperature and the desired temperature within the vehicle compartment is larger than a predetermined value or for decreasing the air quantity to be blown from the blower means when the deviation between the actual temperature and the desired temperature within the vehicle compartment is smaller than the predetermined value, in response to signals from the compartment temperature detecting means and the compartment temperature setting means;
    control quantity detecting means for detecting a control value signal from the air quantity control means; and
    natural wind control means for making the control value signal from the air quantity control means periodically variable when the quantity of air to be blown from the blower means approaches a stable stage in which the quantity of air to be blown is minimized, in response to a signal from the control quantity detecting means;
    wherein the natural wind control means determines an upper limit value of the quantity of air to be blown from the blower means on the basis of a first operation formula (x) using the control value signal from the air quantity control means as a parameter and determines a lower limit value of the quantity of air to be blown therefrom on the basis of a second operation formula (y) using the control value signal from the air quantity control means as a parameter.

2. An air conditioning system as claimed in claim 1, wherein the air quantity control means controls a terminal voltage of the blower means.

3. An air conditioning system as claimed in claim 1, wherein:
    the upper limit value of the quantity of air to be blown from the blower means determined on the basis of the first operation formula (x) is set to be larger than the quantity of air set by the air quantity control means; and
    the lower limit value of the quantity of air to be blown from the blower means determined on the basis of the second operation formula (y) is set to be smaller than the quantity of air set by the air quantity control means.

4. An air conditioning system as claimed in claim 1, wherein the natural wind control means gradually varies the quantity of air to be blown from the blower means in the range between the upper limit value and the lower limit value.

5. An air conditioning system as claimed in claim 4, wherein the natural wind control means varies the quantity of air to be blown from the blower means in a stepwise manner in the range between the upper limit value and the lower limit value.

6. An air conditioning system as claimed in claim 4, wherein the natural wind control means maintains the quantity of air to be blown from the blower means at the upper limit value or the lower limit value of the quantity of air to be blown therefrom for a predetermined period of time when the quantity of air to be blown therefrom reaches its upper limit value or lower limit value.

7. An air conditioning system as claimed in claim 6, wherein the predetermined period of time is variable.

8. An air conditioning system as claimed in claim 6, wherein the predetermined period of time during which the upper limit value of the quantity of air is maintained is different from the predetermined period of time during which the lower limit value of the quantity of air is maintained.

9. An air conditioning system as claimed in claim 1, wherein the air quantity control means controls at least the quantity of air to be blown from the blower means on the basis of a collective signal using the actual temperature and the required temperature within the vehicle compartment as parameters for determining the collective signal.

10. An air conditioning system for an automotive vehicle, comprising:
    compartment temperature detecting means for detecting an acutal temperature within a vehicle compartment;
    compartment temperature setting means for manually setting a desired temperature within the vehicle compartment;
    blower means for feeding conditioning air to the vehicle compartment;
    air quantity control means for increasing an air quantity to be blown from the blower means when a deviation between the actual temperature and the desired temperature within the vehicle compartment is larger than a predetermined value or for decreasing the air quantity to be blown from the blower means when the deviation between the actual temperature and the desired temperature within the vehicle compartment is smaller than the predetermined value, in response to signals from the compartment temperature detecting means and the compartment temperature setting means;
    control quantity detecting means for detecting a control value signal from the air quantity control means; and
    natural wind control means for making the control value signal of the air quantity control means periodically variable when the quantity of air to be blown from the blower means approaches a quasi-stable stage in the vicinity of a stable state in which the quantity of air to be blown therefrom is minimized, in response to a signal from the control quantity detecting means;

wherein the natural wind control means determines an upper limit value of the quantity of air to be blown from the blower means on the basis of a first operation formula (x) using the control value signal from the air quantity control means as a parameter and determines a lower limit value of the quantity of air to be blown therefrom on the basis of a second operation formula (y) using the control value signal from the air quantity control means as a parameter.

* * * * *